United States Patent
Seo et al.

(10) Patent No.: US 11,317,432 B2
(45) Date of Patent: Apr. 26, 2022

(54) METHOD AND DEVICE FOR RECEIVING SIGNAL IN WIRELESS COMMUNICATION SYSTEM

(71) Applicant: LG Electronics Inc., Seoul (KR)

(72) Inventors: Inkwon Seo, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 163 days.

(21) Appl. No.: 16/763,317

(22) PCT Filed: Nov. 16, 2018

(86) PCT No.: PCT/KR2018/014090
§ 371 (c)(1),
(2) Date: May 12, 2020

(87) PCT Pub. No.: WO2019/098748
PCT Pub. Date: May 23, 2019

(65) Prior Publication Data
US 2020/0351924 A1 Nov. 5, 2020

Related U.S. Application Data

(60) Provisional application No. 62/635,569, filed on Feb. 27, 2018, provisional application No. 62/630,231, (Continued)

(51) Int. Cl.
*H04W 72/12* (2009.01)
*H04L 5/00* (2006.01)
(Continued)

(52) U.S. Cl.
CPC ....... *H04W 72/1289* (2013.01); *H04L 5/0053* (2013.01); *H04L 5/0092* (2013.01);
(Continued)

(58) Field of Classification Search
CPC .......... H04W 72/1289; H04W 72/042; H04W 72/0446; H04W 72/1273; H04W 56/001; H04L 5/0053; H04L 5/0092
(Continued)

(56) References Cited

U.S. PATENT DOCUMENTS

2011/0255483 A1  10/2011  Xu et al.
2021/0045121 A1* 2/2021  Kim ...................... H04L 1/1614

OTHER PUBLICATIONS

R1-1718834: NTT Docomo, Inc., "Summary of Key Aspects for search space," 3GPP TSG RAN WG1 Meeting 90bis, Prague, CZ, Oct. 9, 2017, (22 Pages).
(Continued)

*Primary Examiner* — Peter G Solinsky
(74) *Attorney, Agent, or Firm* — Dentons US LLP

(57) ABSTRACT

The method for reception of a signal by a terminal in a wireless communication system according to an embodiment of the present invention may comprise a step of monitoring control channel candidates on the basis of information on precoding granularity. Specifically, even if information on the precoding granularity instructs to the terminal to assume that the reference signal with respect to the control channel candidates is mapped to all resource element groups (REGs) included in consecutive resource blocks in the first control resource set, when some of the consecutive resource blocks overlap with a second control resource set set by a physical broadcasting channel (PBCH), the terminal may not assume that the reference signal with respect to the control channel candidates is mapped to the REGs included in some resource blocks which are overlapping.

17 Claims, 11 Drawing Sheets

(a) Overlap between CORESET (with interleaving) and SSB (b) Overlap between CORESET (with interleaving) and SSB

Related U.S. Application Data filed on Feb. 13, 2018, provisional application No. 62/587,457, filed on Nov. 16, 2017.

(51) Int. Cl.
   *H04W 56/00* (2009.01)
   *H04W 72/04* (2009.01)

(52) U.S. Cl.
   CPC ....... *H04W 56/001* (2013.01); *H04W 72/042* (2013.01); *H04W 72/0446* (2013.01); *H04W 72/1273* (2013.01)

(58) Field of Classification Search
   USPC ........................................................ 370/329
   See application file for complete search history.

(56) References Cited

OTHER PUBLICATIONS

R1-1718488: Interdigital Inc.,"Search Space Design and Coreset configuration," 3GPP TSG RAN WG1 meeting 90bis, Prague, CZ, Oct. 3, 2017 (7 Pages).

R1-1717511: ZTE, Sanechips Coreset configuration and Search space for NR-PDCCH, 3GPP TSG RAN WG1, Meeting 90bis, Prague, CZ, Oct. 2, 2017, (7 Pages).

R1-1711329: Panasonic, "Configuration of Coreset," 3GPP TSG RAN WG1 NR Ad-Hoc #2, Qingdao, P.R. China, Jun. 16, 2017 (3 Pages).

* cited by examiner

[FIG. 1]
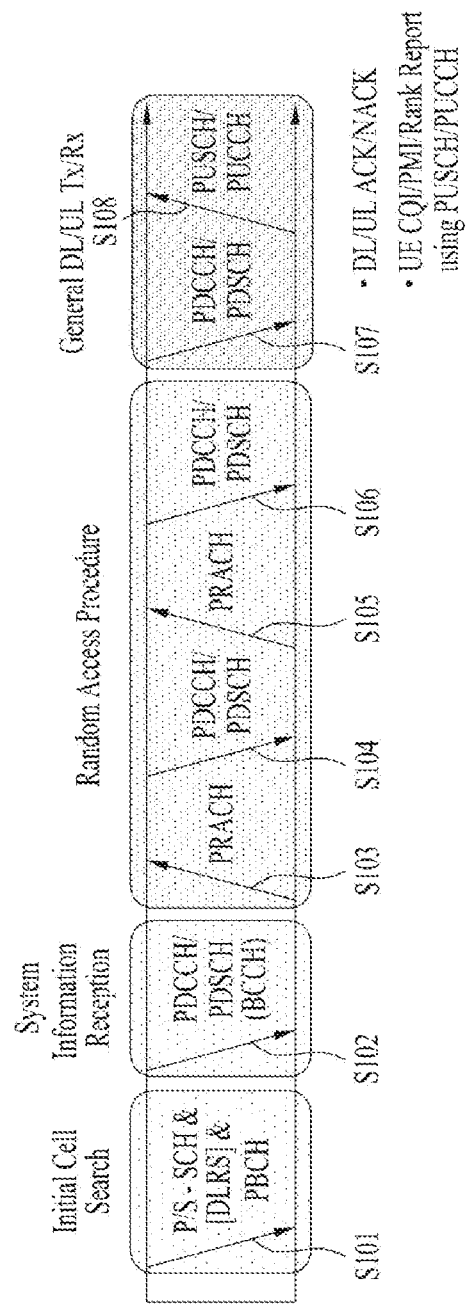

[FIG. 2]
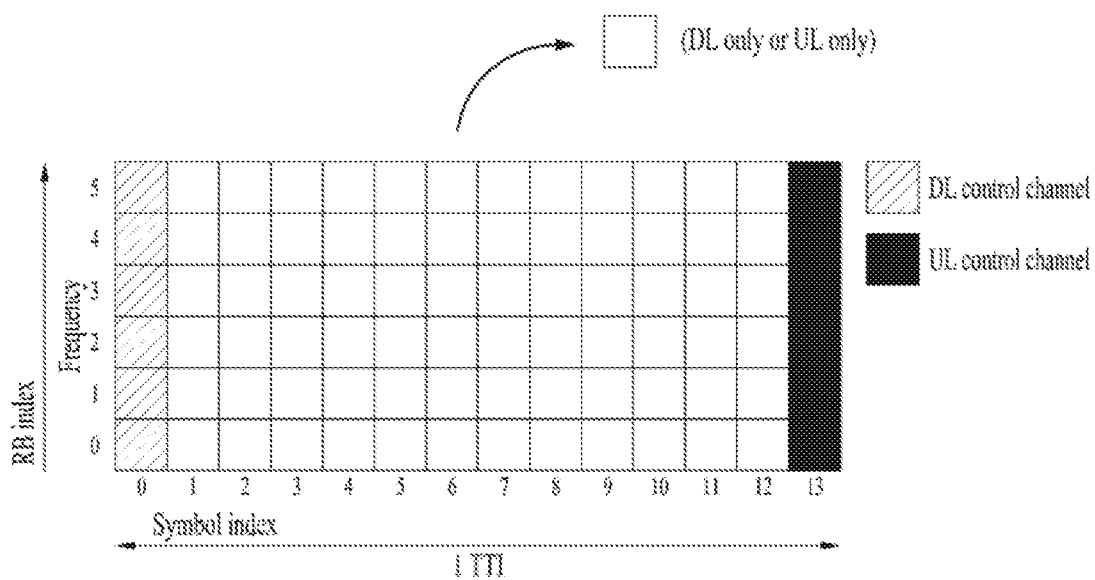

[FIG. 3]
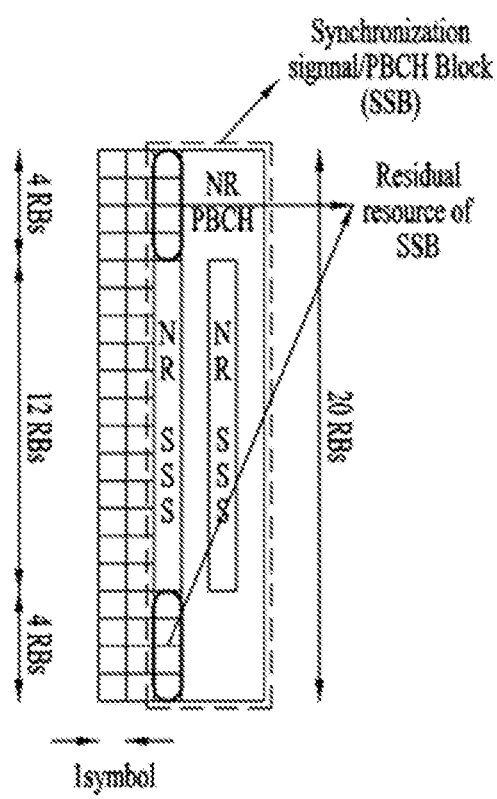

[FIG. 4]
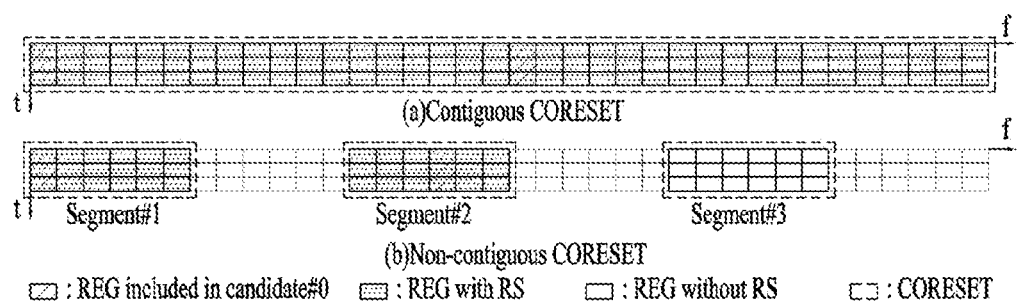

[FIG. 5]
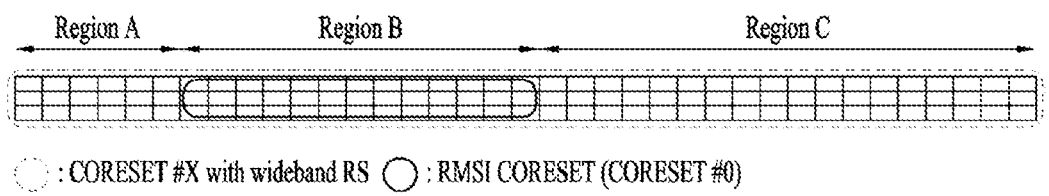

[FIG. 6]
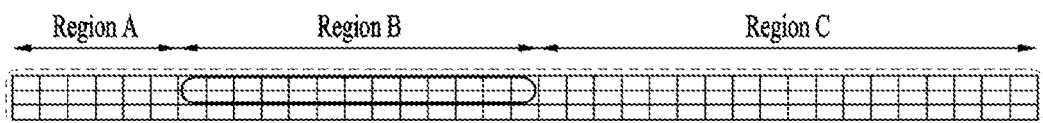
◌ : CORESET #X with wideband RS  ◯ : RMSI CORESET (CORESET #0)

[FIG. 7]
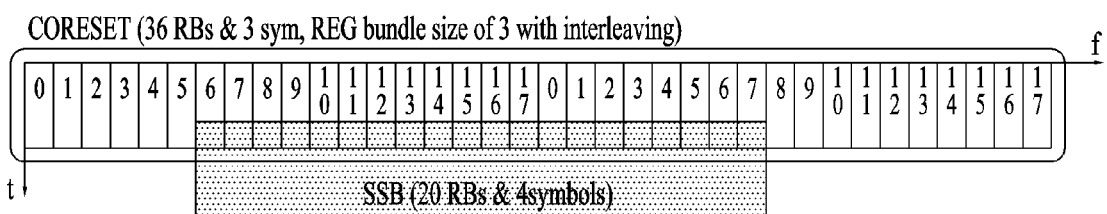
(a) Overlap between CORESET (with interleaving) and SSB
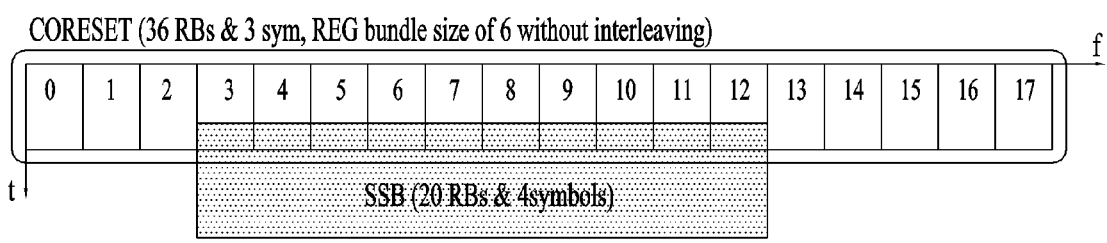
(b) Overlap between CORESET (with interleaving) and SSB

[FIG. 8]
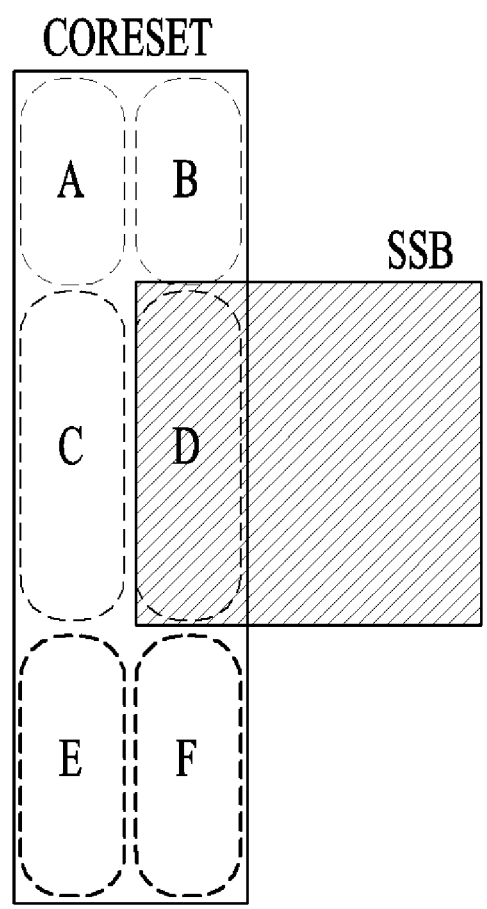

[FIG. 9]
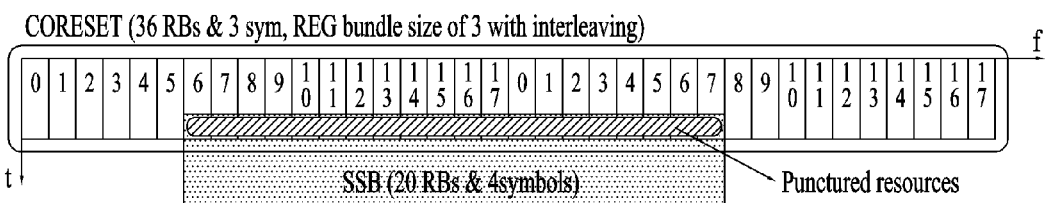
(a)
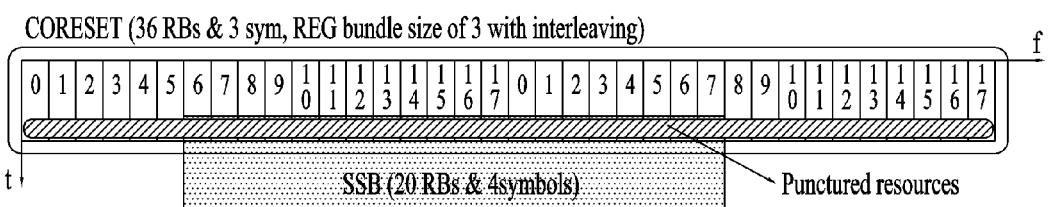
(b)

[ FIG. 10]
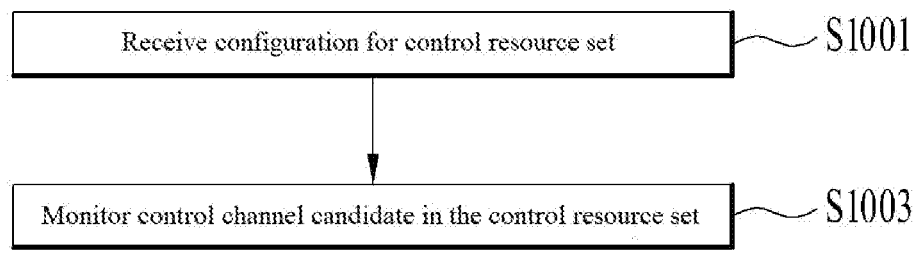

[FIG. 11]
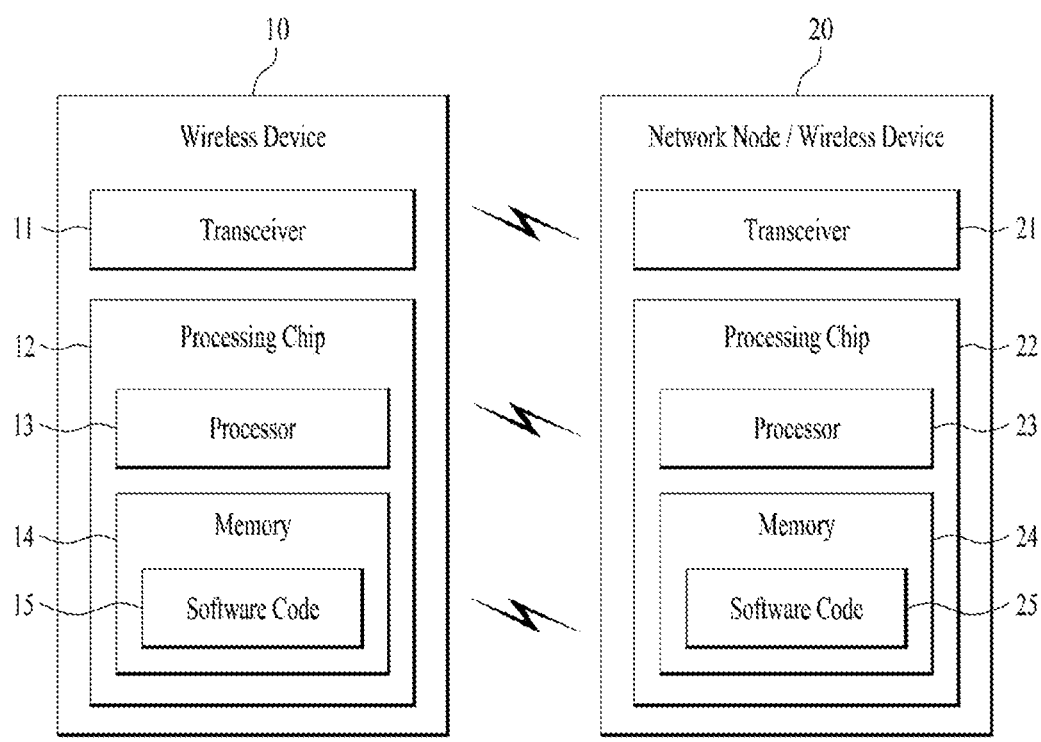

METHOD AND DEVICE FOR RECEIVING SIGNAL IN WIRELESS COMMUNICATION SYSTEM

This application is a National Stage Entry of International Application No. PCT/KR2018/014090 filed Nov. 16, 2018, which claims the benefit of U.S. Provisional Application No. 62/587,457 filed Nov. 16, 2017; 62/630,231 filed Feb. 13, 2018 and 62/635,569 filed Feb. 27, 2018, the contents of which are all hereby incorporated by reference herein in their entirety.

TECHNICAL FIELD

The present disclosure relates to a wireless communication system, and more particularly, to a method of receiving a signal and device therefor. Specifically, the present disclosure is directed to a method and device for receiving a control signal.

BACKGROUND ART

First, the existing 3GPP LTE/LTE-A system will be briefly described. Referring to FIG. 1, a user equipment (UE) performs an initial cell search (S101). In the initial cell search process, the UE receives a primary synchronization channel (P-SCH) and a secondary synchronization channel (S-SCH) from a base station (BS), performs downlink synchronization with the BS, and acquires information such as a cell ID. Thereafter, the UE acquires system information (e.g., MIB) through a physical broadcast channel (PBCH). The UE may check the state of a downlink channel by receiving a downlink reference signal (DL RS).

After the initial cell search, the UE may acquire more detailed system information (e.g., SIB s) by receiving a physical downlink control channel (PDCCH) and a physical downlink control channel (PDSCH) scheduled by the PDCCH (S102).

The UE may perform a random access procedure for uplink synchronization. The UE transmits a preamble (e.g., Msg1) through a physical random access channel (PRACH) (S103), and receives a response message (e.g., Msg2) for the preamble through a PDCCH and a PDSCH corresponding to the PDCCH. In the case of a contention-based random access, a contention resolution procedure such as additional PRACH transmission (S105) and PDCCH/PDSCH reception (S106) may be performed.

Then, the UE may perform PDCCH/PDSCH reception (S107) and physical uplink shared channel (PUSCH)/physical uplink control channel (PUCCH) transmission (S108) as a general uplink/downlink signal transmission procedure. The UE may transmit uplink control information (UCI) to the BS. The UCI may include a hybrid automatic repeat request acknowledgment/negative-acknowledgment (HARQ ACK/NACK), a scheduling request (SR), a channel quality indicator (CQI), a precoding matrix indicator (PMI), and/or a rank indicator (RI).

DISCLOSURE

Technical Problem

The object of the present disclosure is to provide a signal reception method for a UE for efficient monitoring of control channel candidates in a control resource set in a wireless communication system and device therefor.

It is to be understood that both the foregoing general description and the following detailed description of the present disclosure are exemplary and explanatory and are intended to provide further explanation of the disclosure as claimed.

Technical Solution

The present disclosure provides a signal reception method in a wireless communication system and device therefor.

In an aspect of the present disclosure, provided is a method of receiving a signal by a user equipment (UE) in a wireless communication system. The method may include: receiving a configuration for a first control resource set, wherein the configuration includes information on precoder granularity; and monitoring control channel candidates for the first control resource set based on the information on the precoder granularity. In this case, even though the information on the precoder granularity instructs the UE to assume that reference signals for the control channel candidates are mapped to all resource element groups (REGs) included in contiguous resource blocks within the first control resource set, the UE may assume that the reference signals for the control channel candidates are not mapped to REGs included in several resource blocks among the contiguous resource blocks when the several resource blocks overlap with a second control resource set configured by a physical broadcasting channel (PBCH).

When a resource region allocated for the second resource set is included in a resource region allocated for the first resource set, the UE may assume that a reference signal sequence of the first resource set is also used for the second resource set.

The second resource set may be configured by a PBCH included in a serving synchronization signal and PBCH block (SSB) of the UE.

The UE may receive information on the second resource set capable of overlapping with the first control resource set from a network.

When several resource blocks among the contiguous resource blocks overlap with an SSB, the UE may skip monitoring the control channel candidates for the first control resource set in a slot in which the overlap with the SSB occurs.

When several resource blocks among the contiguous resource blocks overlap with an SSB, the UE may perform rate matching for the first control resource set except a frequency region in which the overlap with the SSB occurs.

The first control resource set may include resource block groups, each of which includes 6 resource blocks. When at least one resource block in a resource block group overlaps with the SSB, the UE may perform the rate matching for the first control resource set by assuming that all resource block in the resource block group overlap with the SSB.

The UE may monitor several control channel candidates among the control channel candidates for the first control resource set in a slot in which the overlap with the SSB occurs.

When a semi-static uplink resource is allocated to several resource blocks among the contiguous resource blocks, the UE may skip monitoring the control channel candidates for the first control resource set in a slot to which the uplink resource is allocated.

The UE may determine whether the first control resource set overlaps with an SSB based on first SSB information received through UE-specific signaling. The UE may determine whether the second control resource set overlaps with the SSB based on second SSB information received through cell-specific signaling. When the UE does not receive the first SSB information and the second SSB information, the UE may assume that there is no SSB overlapping with the second control resource set.

When the first control resource set includes no common search space, the UE may determine whether the first control resource set overlaps with an SSB based on first SSB information received through UE-specific signaling. When the first control resource set includes a common search space, the UE may determine whether the first control resource set overlaps with the SSB based on second SSB information received through cell-specific signaling.

In another aspect of the present disclosure, provided is a UE for receiving a signal in a wireless communication system. The UE may include a transceiver and a processor configured to control the transceiver. The processor may be configured to: control the transceiver to receive a configuration for a first control resource set, wherein the configuration includes information on precoder granularity; and monitor control channel candidates for the first control resource set based on the information on the precoder granularity. In this case, even though the information on the precoder granularity instructs the processor to assume that reference signals for the control channel candidates are mapped to all REGs included in contiguous resource blocks within the first control resource set, the processor may be configured to assume that the reference signals for the control channel candidates are not mapped to REGs included in several resource blocks among the contiguous resource blocks when the several resource blocks overlap with a second control resource set configured by a PBCH.

When a resource region allocated for the second resource set is included in a resource region allocated for the first resource set, the processor may be configured to assume that a reference signal sequence of the first resource set is also used for the second resource set.

The second resource set may be configured by a PBCH included in a serving SSB of the UE.

The processor may be configured to control the transceiver to receive information on the second resource set capable of overlapping with the first control resource set from a network It will be understood by those skilled in the art that the above-described aspects of the present disclosure are merely part of the embodiments of the present disclosure and various modifications and alternatives could be developed from the following technical features of the present disclosure.

Advantageous Effects

According to the present disclosure, when a UE monitors control channel candidates in a control resource set, the UE may consider an overlap with other resources, thereby monitoring the control channel candidates in the control resource set more efficiently.

It will be appreciated by persons skilled in the art that that the effects that could be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

FIG. 1 illustrates physical channels used in a 3GPP LTE/LTE-A system and a general signal transmission method using the physical channels.

FIG. 2 is a diagram illustrating a self-contained subframe structure applicable to the present disclosure.

FIG. 3 illustrates an example of a synchronization signal and PBCH block (SSB).

FIG. 4 is a diagram illustrating a contiguous control resource set (CORESET) and a non-contiguous CORESET as examples of a wideband reference signal (WBRS) CORESET FIGS. 5 and 6 are diagrams illustrating an overlap between a WBRS CORESET and a remaining minimum system information (RMSI) CORESET.

FIGS. 7 to 9 are diagrams illustrating an overlap between a CORESET and an SSB according to embodiments of the present disclosure.

FIG. 10 is a conceptual diagram of a signal reception method according to examples of the present disclosure.

FIG. 11 is a block diagram showing an apparatus for embodying embodiment(s) of the present disclosure.

BEST MODE

The following description of examples of the present disclosure may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). 01-DMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. 3GPP LTE adopts OFDMA in downlink and adopts SC-FDMA in uplink. LTE-A (LTE-Advanced) is an evolved version of 3GPP LTE.

For clarity, the following description mainly concerns 3GPP LTE system or 3GPP LTE-A system, by which the technical idea of the present disclosure may be non-limited. Specific terminologies used in the following description are provided to help understand the present disclosure and the use of the terminologies can be modified to a different form within a scope of the technical idea of the present disclosure.

As many as possible communication devices have demanded as high as communication capacity and, thus, there has been a need for enhanced mobile broadband (eMBB) communication compared with legacy radio access technology (RAT) in a recently discussed next-generation communication system. In addition, massive machine type communications (mMTC) for connecting a plurality of devices and objects to provide various services anytime and anywhere is also one of factors to be considered in next-generation communication. In addition, in consideration of a service/user equipment (UE) that is sensitive to reliability and latency, ultra-reliable and low latency communication (URLLC) has been discussed for a next-generation communication system.

As such, new RAT that considers eMBB, mMTC, URLCC, and so on has been discussed for next-generation wireless communication.

Some LTE/LTE-A operations and configuration that are not at variance to a design of New RAT may also be applied to new RAT. For convenience, new RAT may be referred to as 5G mobile communication.

1. NR Frame Structure and Physical Resource

In a new RAT (NR) system, downlink (DL) and downlink (UL) transmission may be performed through frames having duration of 10 ms and each frame may include 10 subframes. Accordingly, 1 subframe may correspond to 1 ms. Each frame may be divided into two half-frames.

1 subframe may include $N_{symb}^{subframe,\mu}=N_{symb}^{slot} \times N_{slot}^{subframe,\mu}$ contiguous OFDM symbols. $N_{symb}^{slot}$ represents the number of symbols per slot, $\mu$, represents OFDM numerology, and $N_{slot}^{subframe,\mu}$ represents the number of slots per subframe with respect to corresponding $\mu$. In NR, multiple OFDM numerologies shown in Table 1 below may be supported.

TABLE 1

| $\mu$ | $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In Table 1 above, $\Delta f$ refers to subcarrier spacing (SCS). $\mu$ and cyclic prefix with respect to a DL carrier bandwidth part (BWP) and $\mu$ and cyclic prefix with respect to a UL carrier BWP may be configured for a UE via UL signaling.

Table 2 below shows the number of $N_{symb}^{slot}$ of symbols per slot, the number $N_{slot}^{frame,\mu}$ of symbols per frame, and the number $N_{slot}^{subframe,\mu}$ of slots per subframe with respect to each SCS in the case of normal CP.

TABLE 2

| $\mu$ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Table 3 below shows the number $N_{symb}^{slot}$ of symbols per slot, the number $N_{slot}^{frame,\mu}$ of slots per frame, and the number $N_{slot}^{subframe,\mu}$ of slots per subframe with respect to each SCS in the case of extended CP.

TABLE 3

| $\mu$ | $N_{symb}^{slot}$ | $N_{slot}^{frame, \mu}$ | $N_{slot}^{subframe, \mu}$ |
|---|---|---|---|
| 2 | 12 | 40 | 4 |

As such, in an NR system, the number of slots included in 1 subframe may be changed according to subcarrier spacing (SCS). OFDM symbols included in each slot may correspond to any one of D (DL), U (UL), and X (flexible). DL transmission may be performed in a D or X symbol and UL transmission may be performed in a U or X symbol. A Flexible resource (e.g., X symbol) may also be referred to as a Reserved resource, an Other resource, or a Unknown resource.

In NR, one resource block (RB) may correspond to 12 subcarriers in the frequency domain. A RB may include a plurality of OFDM symbols. A resource element (RE) may correspond to 1 subcarrier and 1 OFDM symbol. Accordingly, 12 REs may be present on 1 OFDM symbol in 1 RB.

A carrier BWP may be defined as a configured of contiguous physical resource blocks (PRBs). The carrier BWP may also be simply referred to a BWP. A maximum of 4 BWPs may be configured for each of UL/DL link in 1 UE. Even if multiple BWPs are configured, 1 BWP may be activated for a given time period. However, when a supplementary uplink (SUL) is configured in a UE, 4 BWPs may be additionally configured for the SUL and 1 BWP may be activated for a given time period. A UE may not be expected to receive a PDSCH, a PDCCH, a channel state information-reference signal (CSI-RS), or a tracking reference signal (TRS) out of the activated DL BWP. In addition, the UE may not be expected to receive a PUSCH or a PUCCH out of the activated UL BWP.

FIG. 2 is a diagram illustrating a self-contained subframe structure applicable to the present disclosure.

In FIG. 2, the hatched area (e.g., symbol index=0) represents a DL control region, and the black area (e.g., symbol index=13) represents a UL control region. The other area (e.g., symbol index=1 to 12) may be used for DL or UL data transmission.

Based on the self-contained slot structure, a BS and a UE may sequentially perform DL transmission and UL transmission in one slot. That is, the BS and the UE may transmit and receive not only DL data but also UL ACK/NACK for the DL data in one slot. The self-contained slot structure may reduce a time required for data retransmission when a data transmission error occurs, thereby minimizing the latency of the final data transmission.

In the self-contained slot structure, a time gap with a predetermined length is required to allow the BS and the UE to switch from transmission mode to reception mode or vice versa. To this end, some OFDM symbols at the time of switching from DL to UL may set as a guard period (GP).

Although it is described that the self-contained slot structure includes both the DL and UL control regions, these control regions may be selectively included in the self-contained slot structure. In other words, the self-contained slot structure according to the present disclosure may include either the DL control region or the UL control region as well as both the DL and UL control regions as shown in FIG. 7.

For example, a slot may have various slot formats. In this case, OFDM symbols in each slot can be classified into a DL symbol (denoted by 'D'), a flexible symbol (denoted by 'X'), and a UL symbol (denoted by 'U').

Thus, a UE may assume that DL transmission occurs only in symbols denoted by 'D' and 'X' in a DL slot. Similarly, the UE may assume that UL transmission occurs only in symbols denoted by 'U' and 'X' in a UL slot.

2. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

3. Synchronization Signal and PBCH Block (SSB)

FIG. 3 illustrates an example of a synchronization signal and PBCH block (hereinafter referred to as an SSB). One or more SSBs may be defined in the NR system. In FIG. 3, it is illustrated that the SSB starts at the third symbol in a slot. The SSB may be referred to as a synchronization signal block in the following description.

As shown in FIG. 3, an SSB may include a primary synchronization signal (PSS), a secondary synchronization signal (SSS), and a PBCH. The PSS is mapped to 12 contiguous RBs in a specific symbol and transmitted, and the SSS is mapped to 12 contiguous RBs in a symbol different from that of the PSS.

The PBCH is mapped to a region other than the region in which the SSS is transmitted in a bandwidth of 20 RBs in three contiguous symbols and transmitted. 4 RBs adjacent to the frequency domain just below and above the PSS in the symbol in which the PSS is transmitted may be used for any purpose. The 4 RBs adjacent to the frequency domain just below and above the PSS may be referred to as residual resources.

4. NR DL Control Channel

In an NR system, a transmissions NR system, a transmission unit of a control channel may be defined as a resource element group (REG) and/or a control channel element (CCE), etc. The CCE may refer to a minimum unit for control channel transmission. That is, a minimum PDCCH size may correspond to 1 CCE. When an aggregation level is equal to or greater than 2, a network may group a plurality of CCEs to transmit one PDCCH (i.e., CCE aggregation).

An REG may correspond to 1 OFDM symbol in the time domain and may correspond to 1 PRB in the frequency domain. In addition, 1 CCE may correspond to 6 REGs.

A control resource set (CORESET) and a search space (SS) are briefly described now. The CORESET may be a set of resources for control signal transmission and the search space may be aggregation of control channel candidates for performing blind detection. The search space may be configured for the CORESET. For example, when one search space is defined on one CORESET, a CORESET for a common search space (CSS) and a CORESET for a UE-specific search space (USS) may each be configured. As another example, a plurality of search spaces may be defined in one CORESET. For example, the CSS and the USS may be configured for the same CORESET. In the following example, the CSS may refer to a CORESET with a CSS configured therefor and the USS may refer to a CORESET with a USS configured therefor, or the like.

An eNB may signal information regarding a CORESET to a UE. For example, a CORESET configuration for each CORESET may be signaled to the UE, and the CORESET configuration may be signaled in time duration (e.g., 1/2/3 symbol) of the corresponding CORESET, a frequency domain resource of the corresponding CORESET, precoder granularity, an REG-to-CCE mapping type (e.g., interleaved/non-Interleaved), a REG bundling size and an interleaver size in the case of an interleaved REG-to-CCE mapping type, and so on.

When REG-to-CCE mapping with respect to 1-symbol CORESET is a non-interleaved type, 6 REGs with respect to a CCE are grouped to one REG bundle and all REGs of the corresponding CCE may be contiguous. When a plurality of CCEs is present in 1 PDCCH (e.g., when an aggregation level is equal to or greater than 2), CCEs may also be contiguous. A UE may assume the same precoding in 1 REG bundle or may assume the same precoding with respect to a plurality of REG bundles.

When REG-to-CCE mapping with respect to 1-symbol CORESET is an interleaved type, 2, 3, or 6 REGs may configure 1 REG bundle. For example, all REG bundle sizes of 2, 3, and 6 are not supported but, as a subset thereof, for example, an REG bundle size of {2}, {3}, {2,3}, {2,6}, {3,6}, or {2,3,6} may be supported. When an REG bundle size of {2, 6} is supported, 2 REGs may configure 1 REG bundle or 6 REGs may configure 1 REG bundle. A UE may assume the same precoding in 1 REG bundle or may assume the same precoding with respect to a plurality of REGs according to precoder granularity.

In the case of REG-to-CCE mapping with respect to a CORESET having duration of 2 symbols or greater, a REG bundle may be defined in time/frequency domain. When an REG bundle is defined in the time domain, all REGs belonging to 1 REG bundle may belong to the same RB and may correspond to different symbols. When an REG bundle is defined in the time-frequency domain, 1 REG bundle may include REGs belonging to different RBs as well as REGs that belong to the same RB and correspond to different symbols.

Time-first mapping may be supported for REG-to-CCE mapping with respect to a CORESET having duration of 2 symbols or greater. An REG bundle may be supported to be configured on the time domain in the same way as time domain duration of a CORESET. In the case of non-interleaved type, 6 REGs included in a CCE may correspond to 1 REG bundle and REGs of the corresponding CCE may be localized in the time/frequency domain. In the case of an interleaved type, 2, 3, or 6 REGs may correspond to 1 REG bundle and REG bundles may be bundled in a CORESET.

A UE may assume the same precoding in 1 REG bundle or may assume the same precoding with respect to a plurality of REGs according to precoder granularity.

5. Assumption of Precoding for REGs in CORESET

In the NR system, a DL control channel based on a Demodulation Reference Signal (DMRS) may be transmitted by a BS. In addition, a UE receives a DMRS-based DL control channel from the BS. In addition, the UE may decode the DL control channel based on the DMRS. In particular, the UE may perform channel estimation based on the DMRS and demodulate the DL control channel according to the result of the channel estimation.

In this case, a reference signal (RS) for demodulation of the DL control channel may be transmitted only in REGs to which the DL control channel is allocated among DL resources transmitted by the BS. In this case, the number of RSs or RS density may be insufficient, and thus the channel estimation performance of the UE may be degraded during decoding of the DL control channel.

REG bundling has been introduced to prevent or mitigate degradation channel estimation performance. As described above, when an REG bundle is defined in the time-frequency domain, one REG bundle may include not only REGs belonging to the same RB and corresponding to different symbols, but also REGs belonging to different RBs.

The network or the BS may configure precoder granularity to increase DL control channel reception performance of the UE.

Precoder granularity has a value for a range of REGs in which the same precoding is used among a plurality of REGs. Upon receiving information on the precoder granularity, the UE may assume a range of REGs in which the same precoding is used among a plurality of REGs.

The UE may make an additional related assumption other than the precoder granularity based on the information on the precoder granularity. For example, the UE may assume the range of REGs to which an RS is mapped based on the information on the precoder granularity.

Precoder granularity may be configured with respect to the frequency domain (precoder granularity in frequency domain).

The precoder granularity may be configured to increase DL control channel reception performance of a UE (a cell edge UE) located at the edge of a specific cell. The precoder granularity may be configured for each UE. The network/BS may transmit a message of a physical layer or a radio resource control (RRC) layer related to configuration of precoder granularity to the UE.

The network/BS may configure precoder granularity for each CORESET. The network/BS may transmit, to the UE, information about the precoder granularity in the CORESET configuration. The information about the precoder granularity may correspond to a first configuration or a second configuration. The first configuration may be configuring precoder granularity as a wideband RS, and the second configuration may be configuring precoder granularity according as a REG bundle size.

Hereinafter, expression such as "precoder granularity is configured configuring the wideband RS," "the wideband RS is configured or applied for a CORESET," and "precoder granularity is configured as a set of contiguous RBs" may have the same meaning as expressions such as "precoder granularity is indicated by all contiguous Resource Blocks" or "precoder granularity corresponds to all contiguous Resource Blocks."

When the precoder granularity corresponds to all contiguous RBs, the UE assumes that RSs are mapped to all REGs included in a set of contiguous RBs. In addition, the UE may assume the same precoding being used across all the resource-element groups within the set of contiguous resource blocks in the CORESET.

A CORESET in which the precoder granularity is set to all contiguous RBs may be referred to as a wideband reference signal (WBRS) CORESET.

Hereinafter, the expression "precoder granularity is configured as the REG bundle size" may have the same meaning as "precoder granularity is indicated to be the same as the REG bundle" or "precoder granularity is the same as the REG-bundle."

When the precoder granularity is the same as the REG bundle, the UE assumes that an RS is mapped within a plurality of REG bundles constituting a corresponding control channel candidate. In addition, the UE may assume the same precoding being used within a REG bundle.

A CORESET in which the precoder granularity is set to the REG bundle size may be referred to as a narrowband reference signal (NBRS) CORESET.

The mapped RS may be a DMRS for demodulation of a control channel candidate in the CORESET.

FIG. 4 is a diagram illustrating a contiguous CORESET and a non-contiguous CORESET as examples of a WBRS CORESET.

In the present disclosure, the contiguous CORESET refers to a CORESET in which all RBs included in the corresponding CORESET are actually contiguous among WBRS CORESETs of which the precoder granularity is set to all contiguous RBs, and the non-contiguous CORESET refers to a CORESET in which some RBs included in the corresponding CORESET are not contiguous among the WBRS CORESETs with the precoder granularity set to all contiguous RBs.

Each of the CORESETs illustrated in FIG. 4 has a duration of 3 in the time domain. However, the following details are also applicable to a CORESET with a duration of 1 or 2.

A UE may receive the configuration of frequency-domain resources in the CORESET from a BS or a network in the form of a bitmap. Each bit in the bitmap may represent 6 contiguous RBs. Since one bit indicates 6 RBs, one REG bundle in the CORESET may include 6 contiguous RBs. The CORESET may be a contiguous RB set (i.e., contiguous CORESET) including 6 REG bundles, each of which includes 6 RBs, as shown in FIG. 4 (a). The CORESET may be a non-contiguous RB set (i.e., non-contiguous CORESET) including REG bundles, each of which includes 6 RBs, and non-contiguous sections, each of which also includes 6 RBs, as shown in FIG. 4 (b).

As described above, the network or BS may set the precoder granularity of the CORESET to be greater than the REG bundle size (i.e., set the precoder granularity to all contiguous RBs). When the UE performs blind decoding for a specific control channel candidate of the CORESET with the precoder granularity set to all contiguous RBs, the UE may assume that an RS is transmitted not only in an REG including the corresponding control channel candidate but also in each of all contiguous REGs, and the same precoding is applied to the corresponding RSs.

For example, it is assumed that the hatched area in FIG. 4 (a) is a control channel candidate that the UE needs to blind decode. The corresponding control channel candidate is contiguous to all REGs in the contiguous CORESET. In this case, the UE may assume that RSs are transmitted in all 36 REGs included in the CORESET shown in FIG. 4 (a) and the same precoding is applied to all RSs transmitted in all 36 REGs.

As another example, it is assumed that the hatched area in FIG. 4 (b) is a control channel candidate that the UE needs to blind decode. Segments #1, #2, and #3 in the non-contiguous CORESET constitutes each CORESET in a non-contiguous manner. Although the precoder granularity of the non-contiguous CORESET is set to all contiguous RBs, it should be considered that there is a non-contiguous section between REG bundles included in the CORESET.

Since RBs in segment #1 of FIG. 4 (b) are contiguous to each other, the UE assumes that an RS is present in every REG in segment #1 and the same precoding is applied to all REGs in segment #1. In addition, the UE assumes that an RS is present in every REG in segment #2 and the same precoding is applied to all REGs in segment #2. In this case, since segment #1 is not contiguous to segment #2, the UE may not assume that the same precoding is applied to the REGs in segment #1 and the REGs in segment #2. Although the UE does not assume the use of the same precoding, the network/BS may apply the same precoding to each segment and transmit the segments to the UE. Since there is no control channel candidate that the UE needs to monitor in segment #3, the UE may make no assumptions for the RSs and precoder granularity of segment #3.

In the legacy communication system (e.g., LTE/LTE-A), it has been defined that after generation of RS sequences mappable to the maximum downlink RBs of the corresponding communication system, a cell-specific reference signal (CRS) uses a part of a generated RS sequence in consideration of the system bandwidth for transmitting each CRS. In addition, the RS sequence per system bandwidth is determined with respect to the center part of the generated RS sequence.

In the NR system, the RS sequence for a PDCCH may be defined as follows.

For example, a sequence is generated for each CORESET such as the sequence has a length suitable for a corresponding CORESET. Then, the generated sequence may be mapped starting at the starting REG or ending REG of the CORESET. The starting/ending point of the CORESET may be determined with respect to the frequency domain.

As another example, a specific reference point may be designated for the CORESET. The RS sequence for the PDCCH may be defined to be mapped from the designated reference point to the CORESET.

In the NR system, since a maximum of 10 search spaces may be included for PDCCH monitoring in one bandwidth part, an overlap between CORESETs may frequently occur.

If a WBRS CORESET and an NBRS CORESET overlap, the RS sequence used in the WBRS CORESET may equally be used for the NBRS CORESET. The reference point of an RS for PDCCH blind decoding may be determined as a cell-specifically designated point (or a transmission reception point (TRP) specifically designated point) rather than the starting or ending point (or location) of the CORESET. The cell-specifically designated reference point may correspond to PRB #0 indicated by remaining minimum system information (RMSI). Alternatively, the cell-specifically designated reference point may be determined in consideration of an offset configured based on an SSB or an initial active bandwidth part.

In the case of an RMSI CORESET, since the RMSI CORESET is configured based on a physical broadcasting channel (PBCH), the UE may receive no information about a reference point for generating the RS sequence for the RMSI CORESET. Thus, the RS sequence may be generated by determining a specific point in the RMSI CORSET as the reference point.

As system information that cannot be transmitted on the PBCH with a limited size, the RMSI may include, for example, information about UE initial access (e.g., PRACH resource, etc.). In addition, the RMSI CORESET may mean a set of resources for transmitting the RMSI during the initial access procedure at the UE. Herein, the RMSI CORESET may be referred to as a CORESET configured by the PBCH. For the RMSI CORESET, the UE may assume that interleaved REG-to-CCE mapping is applied, the REG bundle size is 6, the interleaver size is 2, and the precoder granularity is set to the REG bundle size.

Assuming that a reference point for generating an RS sequence for a CORESET is k, k for the RMSI CORESET may be subcarrier 0 of the lowest-numbered RB in the RMSI CORESET. Herein, subcarrier 0 of the lowest-numbered RB in the RMSI CORESET may refer to the starting point of the CORESET.

The monitoring periodicity of a search space set in the WBRS CORESET may be different from the monitoring times of the RMSI CORESET. The RMSI CORESET may overlap with the WBRS CORESET at some of the monitoring times according to the monitoring periodicity. The reference point for the WBRS CORESET may be set to PRB #0 (subcarrier 0 in common resource block 0). The reference point for the RMSI CORESET may be located in the RMSI CORESET as described above. When the reference point of the WBRS CORESET is different from that of the RMSI CORESET, the RS sequences of the CORESETs may collide with each other in a region where the CORESETs overlap. The data of the RMSI CORESET may be transmitted in a part of the WBRS CORESET where only an RS is transmitted but no data is mapped, and in this case, the different RS sequences of the CORESETs may be mapped to the same resource.

Hereinafter, a description will be given of UE assumptions or network configurations for the WBRS CORESET when the WBRS CORESET overlaps with the RMSI CORESET.

5.1 Operation when WBRS CORESET and RMSI CORESET Overlap

FIG. 5 illustrates an example in which a WBRS CORESET (CORESET #X) overlaps with an RMSI CORESET (CORESET #0). In FIG. 5, each of the WBRS CORESET and the RMSI CORESET have a duration of 3.

In the NR system, the monitoring periodicity (or transmission periodicity) of the RMSI CORESET is generally greater than those of other CORESETs. Thus, when the RMSI CORESET overlaps with a CORESET that is not the RMSI CORESET, the periodicity thereof may be greater than or equal to the monitoring periodicity of the RMSI CORESET.

In FIG. 5, the WBRS CORESET uses an RS sequence generated by using PRB #0 as the reference point, and the RMSI CORESET uses an RS sequence generated by using the starting point of the RMSI CORESET as the reference point.

As described above, the UE may perform channel estimation by assuming that an RS is transmitted in every REGs included in region A, region B, and region C for CORESET #X, which is the WBRS CORESET and the same precoding is applied to all transmitted RSs. If RSs are mapped to CORESET #0, which is the RMSI CORESET, and then transmitted, the UE may need to perform the channel estimation for each CORESET based on different RSs on the same resources.

When all of the two overlapping CORESETs are not the RMSI CORESET, the RS sequence generated by using PRB #0 as the reference point may be used for the RSs of the two CORESETs. However, when one of the two overlapping CORESETs is the RMSI CORESET as shown in FIG. 5, the following problem may occur.

The RSs of CORESET #X use the RS sequence generated by using PRB #0 as the reference point, and the RSs of CORESET #0 use the RS sequence generated by using the starting point of the CORESET as the reference point. Since the starting point of the RS sequence of the RSs of CORESET #X is different from the starting point of the RS sequence of the RSs of CORESET #0, the channel estimation performance in an overlapping region (region B) may be significantly degraded.

To overcome such a problem, the present disclosure proposes that the UE applies the following assumptions when monitoring CORESET #X.

When the WBRS CORESET overlaps with the RMSI CORESET, the UE may assume that RBs in the overlapping region are not contiguous.

For example, the WBRS CORESET and the RMSI CORESET may overlap in region B, which is a part of CORESET #X. Even though CORESET #X is composed of contiguous RBs over regions A, B, and C, the UE may assume that there is a discontinuity in region B where CORESET #X overlaps with the RMSI CORESET. When the UE assumes that the discontinuity is present in region B of CORESET #X, it may be interpreted to mean that the UE assumes that no wideband RS is mapped to CORESET #X. Alternatively, when the UE assumes that the discontinuity is present in region B of CORESET #X, it may be interpreted to mean that the UE assumes CORESET #X as a non-contiguous CORESET including regions A and C in a slot where the overlap occurs.

The UE may assume that no RS is mapped to region B. In addition, the UE may assume that the precoding applied to region B is not the same as that applied to regions A and C. Further, the UE may not assume that the same precoding is applied to RSs mapped to region A and RSs mapped to region C.

As described above, the RS sequence of the RSs mapped to the WBRS CORESET may be generated by using PRB #0 as the reference point. In this case, the UE may assume that an RS sequence corresponding to a region in which the UE assumes an RS to be transmitted is mapped to the location of each RS. When the UE assumes that the discontinuity occurs in region B of CORESET #X, the UE may assume that no RS is mapped to region B. Thus, the UE may assume that no RS sequence is mapped to region B.

Alternatively, when performing REG or CCE indexing in the slot where the overlap occurs, the UE may perform the REG or CCE indexing by excluding region B.

In the slot where the overlap occurs, the UE may assume that the same precoding is applied to the RSs mapped to region A. The UE may assume that the same precoding is applied to the RSs mapped to region C. The UE may not assume that the same precoding is applied to the RSs mapped to region A and the RSs mapped to region C.

Alternatively, the UE may assume CORESET #X as two contiguous CORESETs, which are separated by the RMSI CORESET, rather than one non-contiguous CORESET. Referring to FIG. 5, the UE may assume that there are one contiguous CORESET transmitted in region A and one contiguous CORESET transmitted in region C. The UE may assume that an RS is mapped to every RB in region A and the same precoding is applied to the mapped RSs. The UE may assume that an RS is mapped to every RB in region C and the same precoding is applied to the mapped RSs. As described above, the UE may not assume that the same precoding is applied to the RSs mapped to region A and the RSs mapped to region C.

Hereinabove, the present disclosure has been described based on an example in which the WBRS CORESET overlaps with the RMSI CORESET. However, the method and device according to the present disclosure may be implemented such that the operations when the WBRS CORESET overlaps with the RMSI CORESET are also used when the NBRS CORESET overlaps with the RMSI CORESET.

Further, the details of when the WBRS CORESET overlaps with the RMSI CORESET, which will be described later, are also applicable to the NBRS CORESET.

FIG. 6 illustrates another example in which the WBRS CORESET (CORESET #X) overlaps with the RMSI CORESET (CORESET #0). In FIG. 6, the WBRS CORESET has a duration of 3, and the RMSI CORESET has a duration of 2. In FIG. 6, the WBRS CORESET partially overlaps with the RMSI CORESET in the time domain.

The details described above with reference to FIG. 5 may be equally applied when the WBRS CORESET partially overlaps with the RMSI CORESET in the time domain as shown in FIG. 6.

When the same method is applied regardless of whether the WBRS CORESET fully or partially overlaps with the RMSI CORESET in the time domain, the UE may assume that there is a discontinuity in region B where CORESET #X overlaps with the RMSI CORESET (and more particularly, region B in the frequency domain and duration 3 in the time domain) even though CORESET #X is composed of contiguous RBs over regions A, B, and C.

The UE may assume that RSs are mapped to regions A and C, whereas the UE may assume that no RS is mapped to region B. The UE may assume the same precoding is applied to RSs mapped to region A and the same precoding is applied to RSs mapped to region C. The UE may not assume that the same precoding is applied to the RSs mapped to region A and the RSs mapped to region C.

Alternatively, when performing REG or CCE indexing in a slot where the overlap occurs, the UE may perform the REG or CCE indexing by excluding region B.

Alternatively, when the WBRS CORESET partially overlaps with the RMSI CORESET in the time domain, UE/BS operations may be defined separately for overlapping and non-overlapping regions in the time domain.

When the WBRS CORESET partially overlaps with the RMSI CORESET in the time domain as shown in FIG. 6, the UE may perform puncturing of REGs and RSs in region B of the WBRS CORESET which overlap with those of the RMSI CORESET in the time domain.

When it is said that the UE punctures a specific resource, it may mean that although the UE assumes that a specific signal is mapped to the corresponding resource, the UE does not decode a signal received on the corresponding resource. When it is said that the UE performs rate matching except a specific resource, it may mean that the UE assumes that no signal is mapped to the corresponding resource and does not decode a signal received on the corresponding resource.

When the top and bottom portions of CORESET #X in FIG. 6 are defined as the first and third symbols, respectively, the UE may assume that the discontinuity occurs in the first and second symbols in region B. The UE may assume that no RS is transmitted in the first and second symbols in region B of CORESET #X. In the first and second symbols, the UE may assume that the same precoding is applied to the RSs mapped to region A and the same precoding is applied to the RSs mapped to region C.

CORESET #X includes contiguous RBs in regions A, B, and C in the third symbol, unlike the first and second symbols. Thus, in the third symbol, the UE may assume that an RS is transmitted in every RB in regions A, B, and C, and the same precoding is applied to the transmitted RSs.

In FIGS. 5 and 6, when the RMSI CORESET overlaps with a CORESET that is not the RMSI CORESET (i.e., CORESET #X), a resource region allocated for CORESET #X includes a resource region allocated for the RMSI CORESET. The UE may assume that the RS sequence generated by using PRB #0 as the reference point is used for the RMSI CORESET, instead of using the RS sequence generated by using the starting point of the RMSI CORESET as the reference point. When CORESET #X overlaps with a CORESET that is not the RMSI CORESET (e.g., CORESET #Y), if a resource region allocated for CORESET #Y is included in the resource region allocated for CORESET #X, the UE may apply the same assumption.

On the contrary, when CORESET #X overlaps with the RMSI CORESET, the resource region allocated for CORESET #X may be included in the resource region allocated for the RMSI CORESET in the time/frequency domain. If a CORESET that is not the RMSI CORESET uses an RS sequence different from that of the RMSI CORESET, there may be an ambiguity in the UE operation.

To avoid such an ambiguity, the UE may assume that instead of the RS sequence generated by using PRB #0 as the reference point, the RS sequence generated by using the starting point of the RMSI CORESET is used for RSs of the CORESET that is not the RMSI CORESET.

For example, although FIGS. 5 and 6 show that CORESET #X includes a resource region wider than the RMSI CORESET in the time/frequency domain, the entirety of the resource region of CORESET #X may be included in the resource region of the RMSI CORESET. In this case, the UE may assume that the RS sequence generated by using the starting point of the RMSI CORESET is used for CORESET #X, instead of using the RS sequence generated by using PRB #0 as the reference point.

This may be generalized as follows. When the WBRS CORESET overlaps with another CORESET (regardless of whether the other CORESET is the RMSI CORESET), the UE may assume that an RS sequence generated with respect to a CORESET with the reference point located at a lower frequency location is applied to the two CORESETs.

For a specific CORESET, the network/BS may transmit to the UE information on a region in which the RS sequence according to the prior art is to be used and information on a resource region in which the RS sequence according to the proposed method is to be used. The network/BS may transmit the information to the UE through higher layer signaling (e.g., RRC signaling).

In the NR system, one BS may communicate with UE(s) through one or more analog beams or one or more TRPs. When the BS transmits a plurality of analog beams, a plurality of SSBs respectively corresponding to the plurality of analog beams may be transmitted. In the NR system, a maximum of 64 SSBs may be transmitted.

The UE may perform measurement for each of the plurality of analog beams and then select a serving SSB based on measurement results therefor. That is, the UE may transmit and receive a signal with the BS through an analog beam associated with the serving SSB. The UE may obtain the resource configuration of an RMSI CORESET which the UE needs to decode, based on PBCH information included in the serving SSB.

An analog beam associated with an SSB that is not selected by the UE as the serving SSB may not be used by the UE for communication with the BS. Alternatively, the analog beam associated with the SSB that is not selected by the UE may correspond to a beam that is difficult for the UE to receive. Even if the network/BS transmits two CORESETs overlapping in the time/frequency domain, the UE may receive only a CORESET transmitted on the analog beam associated with the serving SSB.

From the perspective of the UE, it is efficient to consider only an RMSI CORESET associated with the serving SSB when the network/BS defines SSBs for beams less correlated with the UE. An RMSI CORESET transmitted on an analog beam associated with an SSB rather than the serving SSB may cause less or no interference to the UE. Similarly, an RMSI CORESET transmitted from a TRP associated with an SSB rather than the serving SSB may cause less or no interference to the UE. Thus, when an RS transmitted in a WBRS CORESET that the UE intends to monitor is multiplexed with an RMSI CORESET transmitted on a beam/TRP associated with an SSB that is not the serving SSB, it may not significantly affect the performance of the UE.

Thus, the UE may operate by considering an overlap between the WBRS CORESET and some of all RMSI CORESETs transmitted from the BS.

The following standards may be used to determine the RMSI CORESETs.

The UE may perform the operations described above with reference to FIGS. 5 and 6 only when the WBRS CORESET overlaps with the RMSI CORESET associated with the serving SSB selected by the UE. It may be predefined that the UE considers only the RMSI CORESET associated with the serving SSB selected by the UE. The UE may receive a signal indicating that the UE needs to consider the RMSI CORESET associated with the serving SSB selected by the UE from the network/BS.

Alternatively, the UE may be directly provided with an RMSI CORESET that may overlap with the WBRS CORESET from the network/BS. The network/BS may transmit such information to the UE through higher layer signaling. Information on the RMSI CORESET that the UE needs to consider regarding the overlap may include information on the resource allocation, transmission periodicity, etc. of the RMSI CORESET.

Upon receiving the indication from the network/BS, the UE may perform operations related to CORESET overlapping by considering RMSI CORESETs.

Further, the UE may perform the operations related to CORESET overlapping (e.g., blind decoding of the WBRS CORESET) by considering both the RMSI CORESET associated with the serving SSB and the RMSI CORESET indicated by the network/BS.

The above-described operations may be performed in each RMSI CORESET monitoring window. The RMSI CORESET may be blind decoded within a monitoring window composed of multiple slots in consideration of the flexibility of the network. The above-described operations related to the overlap between the WBRS CORESET and the RMSI CORESET may be performed in each RMSI CORESET monitoring window.

Monitoring priority may be established between monitoring windows. For example, a mapping relationship may be defined between SSB indices and other resources in the monitoring window.

5.2 Operation when CORESET and SSB Overlap

When a UE performs blind decoding for a WBRS CORESET, there may be an overlap with an SSB in addition to an RMSI CORESET.

When non-slot based scheduling is used in the NR system, the starting symbol of a CORESET may be a random symbol in a slot. The SSB may be transmitted by determining a random symbol in the slot as the starting symbol thereof. Accordingly, the CORESET and the SSB may overlap at any location in the slot.

Hereinafter, a description will be given of BS and UE operations when the CORESET overlaps with the SSB.

When the time and frequency resources allocated for the CORESET are the same as those allocated for the SSB as illustrated in FIG. 7, it may be said that the resources allocated for the CORESET overlaps with the resources allocated for the SSB.

When the WBRS CORESET overlaps with the SSB, the UE may assume that puncturing or rate matching is performed in an overlapping region as similar to when the WBRS CORESET overlaps with the RMSI CORESET. Alternatively, the UE may skip monitoring of a control channel candidate including overlapping resources. However, when the UE skips monitoring of the control channel candidate, radio resources may be wasted.

FIG. 7 illustrates an overlap between a CORESET and an SSB according to an embodiment of the present disclosure. Hereinafter, problems caused when monitoring is skipped will be described with reference to FIG. 7.

It is assumed that the CORESET illustrated in FIG. 7 (a) includes 36 RBs in the frequency domain and has a duration of 3 in the time domain. In addition, it is assumed that interleaving is applied and the REG bundle size is 3 REGs. In the CORESET of FIG. 7, each of the numbers from 0 to 17 assigned to each REG bundle means a CCE index.

FIG. 7 (a) illustrates that all CCEs with indices 0 to 17 overlap with the SSB when the bandwidth of the SSB is included in the bandwidth of the CORESET.

If the UE skips monitoring of control channel candidates where the overlap occur, the CORESET illustrated in FIG. 7 (a) has no control channel candidate capable of being monitored.

If the CORESET has a sufficiently large bandwidth, there may be a control channel candidate associated with a CCE that does not overlap with the SSB. However, in this case, it is difficult to guarantee whether to secure sufficient CCEs where the UE is capable of performing blind decoding.

It is assumed that the CORESET illustrated in FIG. 7 (b) includes 36 RBs in the frequency domain and has a duration of 3 in the time domain. In addition, it is assumed that no interleaving is applied and the REG bundle size is 6 REGs. In FIG. 7 (b), only CCES with indices 3 to 12 overlap with the SSB.

A (localized mapping) CORESET shown in FIG. 7 (b) where no interleaving is applied may cause fewer problems in an overlap with the SSB, compared to a (distributed mapping) CORESET shown in FIG. 7 (a) where interleaving is applied. However, the CORESET shown in FIG. 7 (b) where no interleaving is applied may have few or no control channel candidates with a higher aggregation level due to the overlap with the SSB. When the CORESET overlaps with the SSB as shown in FIG. 7 (b), a control channel candidate with aggregation level of 8 may not be configured for the CORESET. Although a control channel candidate with aggregation level of 4 may be configured for the CORESET of FIG. 7 (b), the UE may not use the control channel candidate due to the low aggregation level.

Hereinafter, the present disclosure proposes methods of solving problems caused by the overlap between the CORESET and the SSB.

When the CORESET overlaps with the SSB, the UE may not perform blind decoding for the CORESET in a slot where the overlap occurs. This may be interpreted to mean that when the CORESET overlaps with the SSB, the UE skips monitoring of the overlapping CORESET in the slot where the overlap occurs. Whether the UE skips monitoring or not may be predefined.

When the CORESET overlaps with the SSB, whether the UE skips monitoring may be determined based on non-overlapping resources. For example, when a specific CORESET overlaps with the SSB, whether the UE skips monitoring may be determined by considering non-overlapping resources in the frequency domain (e.g., the number of REGs, the number of REGS, the number of CCEs, the number of control channel candidates, etc.). When the number of non-overlapping resources in the frequency domain is less than or equal to a threshold, the UE may be configured to skip CORESET-level monitoring. The threshold may be predefined for the UE. Alternatively, the UE may receive the threshold from the network/BS through higher layer signaling.

The UE may assume that the CORESET does not overlap with the SSB. For example, the UE may assume that the network/BS schedules the CORESET and the SSB such that there is no overlap between the CORESET and the SSB.

When the CORESET and the SSB overlap in a specific slot, if the overlap occurs in a resource region of the CORESET in the frequency domain, the UE may perform rate matching in the corresponding resource region in the time domain even though no overlap occurs therein.

For example, when the CORESET and the SSB partially overlap in the time domain as shown in FIG. 7, the UE may perform rate matching in the entirety of the resource region of the CORESET where the overlap occurs in the frequency domain. In this case, the UE may perform REG indexing, REG bundle indexing, or CCE indexing except the resource region where the overlap occurs in the frequency domain. Herein, CORESET reconfiguration may mean that the UE performs new indexing on CORESET resources in consideration of the overlapping resource region in the frequency domain.

Referring to FIG. 7 (a), the UE may configure a search space by allocating REG bundle indices of 0 to 15 to the remaining REG bundles except 20 REGs which overlap with the SSB.

To avoid an ambiguity when the UE performs resource indexing and configures control channel candidates after rate matching, the UE may be configured to perform the rate matching of the CORESET on a 6-RB basis. In the NR system, since the REG bundle size may be determined as 1, 2, 3, or 6, the ambiguity may be reduced by performing the rate matching of the overlapping CORESET on the 6-RB basis.

The UE may perform rate matching of the entirety of a RB group including 6 RBs even when one RB in the RB group including 6 RBs overlaps with the SSB in one symbol. This may be interpreted to mean that even when the RB group including 6 RBs partially overlaps with the SSB, the UE assumes that the entirety of the corresponding RB group is not allocated by a CORESET configuration (the UE assumes that an RBG allocated by the CORESET configuration is deconfigured in a slot if the allocated RBG partially or fully overlaps with the SSB including unused resources in the SSB).

The UE performs REG bundle indexing for REG bundles except RB groups partially or fully overlapping with the SSB. After performing the REG bundling indexing, the UE may configure control channel candidates by performing hashing according to a hash function Referring to FIG. 7 (a), the UE may configure a search space by allocating REG bundle indices of 0 to 11 to an RB group including 6 RBs located in the lowest frequency band of the CORESET and an RB group including 6 RBs located in in the highest frequency band of the CORESET.

In FIG. 7 (a), if the SSB is located in a frequency band lower by one RB than the illustrated one, the UE may configure the search space by allocating REG bundle indices of 0 to 5 to the RB group including the 6 RBs located in the highest frequency band of the CORESET without allocating any REG bundle indices to the RB group including the 6 RBs located in the lowest frequency band of the CORESET.

When the SSB overlaps with the CORESET, the UE may exclude a minimum of four RB groups (i.e., 24 RBs) and a maximum of 5 RB groups (i.e., 30 RBs) in performing the REG bundling indexing since the SSB includes 20 RBs.

The 6-RB basis rate matching or resource indexing may be applied not only to the overlap between the CORESET and the SSB but also to the overlap between CORESETs, which is described above.

When the rate matching is applied to the CORESET, available resources (e.g., the number of CCEs) in the CORESET may be reduced. Thus, the UE may not perform blind decoding of all control channel candidates defined in a search space set associated with the CORESET.

When the amount of available resources in the CORESET is reduced due to the overlap between the CORESET and the SSB, the UE may be configured to perform blind decoding of some of the control channel candidates defined in the search space set associated with the CORESET in the slot where the overlap occurs. Alternatively, the number of defined control channel candidates may be reduced in advance. The number of control channel candidates may be reduced based on the ratio of overlapping resources to all resources in the CORESET. Further, the number of control channel candidates may be reduced based on the ratio of unavailable resources due to the overlap to all resources in the CORESET.

When the CORESET includes an uplink resource based on semi-statically configured downlink/uplink (DL/UL) assignment, the UE may consider that the CORESET overlaps with the corresponding UL resource and then apply the operations in the case of the overlap between the CORESET and the SSB in the same manner.

If the UL resource is allocated to a specific symbol in the time domain, the UL resource may be allocated not only to 20 RBs but also to the entirety of a bandwidth part in which the CORESET is located in the frequency domain. When the operations in the case of the overlap between the CORESET and the SSB are equally applied, the UE may skip monitoring of the entirety of the CORESET in the slot where the overlap occurs since the entire bandwidth of the CORESET overlaps with the UL resource in the frequency domain. Considering that a guard period (GP) is generally allocated before the UL resource and the CORESET has a short duration, i.e., a duration of 3, the UE may skip monitoring of the entirety of the CORESET (the UE may skip monitoring of all SS sets in the CORESET if the CORESET partially or fully overlaps with a UL OFDM symbol by semi-static DL/UL assignment).

The UE may perform rate matching only for the symbol to which the UL resource is allocated. For example, assuming that the CORESET has a duration of 3 and the UL resource is allocated to the third symbol, REG-to-CCE mapping may be performed in the first and second symbols of the CORESET.

FIG. 8 illustrates an overlap between a CORESET and an SSB according to an embodiment of the present disclosure.

Hereinafter, a description will be given of UE's assumptions for an RS when the CORESET overlaps with the SSB.

When the CORESET and the SSB overlap as shown in FIG. 8, there may be REG bundle(s) overlapping with the SSB and REG bundle(s) not overlapping with the SSB among a plurality of REG bundles in the CORESET.

When the CORESET and the SSB overlap as shown in FIG. 8, the UE may perform monitoring or blind decoding of the CORESET by separating an overlapping resource region from a non-overlapping resource region.

When the CORESET and the SSB overlap as shown in FIG. 8, the UE may assume that no RS is mapped to region D, a resource region in which the CORESET and the SSB overlap both in the frequency and time domains. This may mean that the UE may perform rate matching of REGs included in region D.

To improve the performance of the rate matching, the UE may assume that RSs are mapped to all REGs included in regions A, C, and E contiguous in the frequency domain and the same precoding is applied to the mapped RSs. The UE may assume that RSs are mapped to region B independently of regions A, C, and E and the same precoding is applied to the RSs mapped to region B. The UE may assume that RSs are mapped to region F independently of regions A, C, and E and region B and the same precoding is applied to the RSs mapped to region F.

For noise suppression in the time domain, the UE may assume that RSs are mapped to all of regions A, B, C, E, and F and the same precoding is applied to the mapped RSs. When the UE performs channel estimation based on the RSs, the UE may perform frequency-domain channel estimation by performing discrete Fourier transform based (DFT-based) channel estimation in each of regions A, C, and E, region B, and region F. In the time domain, the UE may calculate the average of per-symbol channel estimation results as the channel estimation result. Alternatively, the UE may perform the frequency-domain channel estimation by performing one-shot DFT-based channel estimation for all of region A, B, C, E, and F. Further, the UE may perform minimum mean-square error (MMSE) channel estimation for all of region A, B, C, E, and F on the assumption of the same precoding.

As described above with reference to FIG. 7, when the UE is configured to skip monitoring of control channel candidates, region C, which is located at the same frequency-domain location as region D, is not used for control channel transmission. The CORESET of FIG. 8 may overlap with another CORESET, the UE may assume that no RS is mapped to region C by considering interference reduction between the CORESETs. For example, when RSs are independently mapped to regions A, B, E, and F and the same precoding is applied only to the RS in each region. Alternatively, the UE may assume that no RS is mapped to all resource regions where non-monitored control channel candidates are mapped. However, when it is assumed that no RS is mapped to all resource regions where the non-monitored control channel candidates are mapped, it may be assumed that the same precoding is applied to non-contiguous RSs due to distributed mapping applied to the CORESET. Therefore, the UE may assume that no RS is mapped to an RB or an RB group including a resource overlapping with the SSB>

For the noise suppression, the UE may assume that the same precoding is applied to regions A and B contiguous in the time domain. In addition, the UE may assume that the same precoding is applied to regions E and F contiguous in the time domain. The UE may perform one-shot 2D MMSE channel estimation for both regions A and B. Alternatively, the UE may perform the frequency-domain channel estimation for each of regions A and B and calculate the average of channel estimation results.

For the improvement of the channel estimation, the UE may assume that RSs are mapped to region C. In this case, the UE may assume that other signals including the RS are not mapped to resource elements in region C where no RSs are mapped. The UE may assume that RSs are mapped to regions A, C, and E and the same precoding is applied to the RSs mapped to regions A, C, and E.

The UE may assume that RS mapping is performed according to a CORESET configuration. For example, although the UE performs rate matching of an RB group including a resource region overlapping with the SSB, the UE may assume that RSs are mapped to the corresponding RB group as described above with reference to FIG. 7. This may mean that the RSs are mapped to the corresponding RB group although the UE is incapable of receiving control information in the corresponding RB group.

The UE's assumptions for the RS may be applied not only when the CORESET overlaps with the SSB but also when the CORESET overlaps with a UL resource configured by semi-static UL/DL assignment. Further, the UE's assumptions for the RS may be applied when the CORESET overlaps with a semi-static rate matching resource.

The UE's assumptions for the RS may be preconfigured for the UE. Alternatively, the assumptions for the RS may be provided by the network/BS to the UE through higher layer signaling.

Hereinafter, a description will be given of SSB standards that the UE needs to consider when the CORESET overlaps with the SSB.

The network/BS may transmit information on SSB transmission to the UE. The UE may receive the information on the SSB transmission from the network/BS through cell-specific signaling or UE-specific signaling and configure an operation for SSB reception based on the received information.

Each UE may receive the information on the SSB information through the UE-specific signaling at a different time. Thus, each UE may determine the overlap between the CORESET and the SSB at a different time. Thus, when there are multiple UEs that perform blind decoding of the CORESET transmitted in a specific slot, each UE may differently determine whether the corresponding CORESET overlaps with the SSB.

For example, assuming that UE A receives the information on the SSB transmission through the UE-specific signaling, UE A may determine that the CORESET and the SSB overlap in the specific slot as shown in FIG. 8 and then perform the operations in the case of the overlap between the CORESET and the SSB. On the other hand, assuming that UE B fails to receive the information through the UE-specific signaling but receives the information on the SSB transmission through the cell-specific signaling, UE B may assume that no SSB is transmitted in the specific slot. UE B may perform blind decoding of a WBRS CORESET without performing the operations in the case of the overlap between the CORESET and the SSB.

To solve such a problem that each UE operates differently at the same time, the following methods are proposed.

The UE may consider both the information received through the cell-specific signaling and the information received through the UE-specific signaling. The UE may make assumptions for the RS and precoding of the CORESET at least based on the information received through the cell-specific signaling.

When the UE fails to receive the information through the UE-specific signaling but receives only the information through the cell-specific signaling, the UE may assume the precoder granularity of the corresponding CORESET is set to the REG bundle size regardless of CORESET configurations.

In general, the information received through the cell-specific signaling is updated based on the information received by the UE through the UE-specific signaling. When an SSB that is not indicated by the information through the cell-specific signaling is configured in a specific slot, the channel estimation performance of the UE may be degraded if the UE receives only the information through the cell-specific signaling. Thus, when failing to receive the information through the UE-specific signaling, the UE may assume the precoder granularity of every CORESET to be the REG bundle size regardless of CORESET configurations. When receiving the information through the UE-specific signaling, the UE may perform the operations in the case of the overlap between the CORESET and the SSB based on the received information.

When the UE receives only the information through the cell-specific signaling and when the CORESET overlaps with an SSB configured based on the received information, the UE may perform the operations in the case of the overlap between the CORESET and the SSB without assuming that the precoder granularity of the CORESET is the REG bundle size.

The UE may perform the operations in the case of the overlap between the CORESET and the SSB by considering only an SSB configured based on recently received information. Whether the recently received information is received through the cell-specific signaling or the UE-specific signaling is not considered. The network/BS may schedule control channel transmission such that an SSB configured for the UE is equal to an actually transmitted SSB. The UE may trust the scheduling from the network/BS and then perform the operations in the case of the overlap between the CORESET and the SSB by considering only the SSB configured based on the recently received information.

When the CORESET overlapping with the SSB is an RMSI CORESET, the UE may perform the operations in the case of the overlap between the CORESET and the SSB by considering only an SSB based on the information received through the cell-specific signaling. When the CORESET overlapping with the SSB is not the RMSI CORESET, the UE may perform the operations in the case of the overlap between the CORESET and the SSB by considering only an SSB based on the information received through the UE-specific signaling. When the UE does not receive the information through the UE-specific signaling, the UE may perform the operations in the case of the overlap between the CORESET and the SSB by considering the SSB the information received through the cell-specific signaling even for a CORESET that is not the RMSI CORESET.

When performing blind decoding of RMSI scheduling information in the RMSI CORESET, the UE may assume that there is no SSB overlapping with the RMSI CORESET. Thereafter, when performing blind decoding of information masked with an RNTI rather than the RMSI scheduling information in the RMSI CORESET, the UE may perform the operations in the case of the overlap between the CORESET and the SSB by considering the SSB based on the information received through the cell-specific signaling. When it is said that the UE performs the blind decoding of the RMSI scheduling information, it may be considered that the UE fails to receive the information on the SSB transmission since information on the SSB may be provided by the network/BS to the UE through RMSI.

For a CORESET including a common search space (CSS), the UE may perform the operations in the case of the overlap between the CORESET and the SSB by considering the SSB based on the information received through the cell-specific signaling. For a CORESET including no CSS, the UE may perform the operations in the case of the overlap between the CORESET and the SSB by considering the SSB based on the information received through the UE-specific signaling. Since multiple UEs may monitor the CSS, the information through the cell-specific signaling may be preferred than the information through the UE-specific signaling. By doing so, the UE may mitigate problems that occur when the SSB information through the cell-specific signaling is different from the SSB information through the UE-specific signaling.

When the CORESET overlaps with the SSB, the UE may reconfigure the CORESET by performing rate matching, REG indexing, etc. In this case, the REG bundle size may vary according to the CORESET reconfiguration.

Hereinafter, a description will be given of additional UE operations when the CORESET partially overlaps with the SSB.

The network/BS may allocate the same CORESET to multiple UEs for the efficient use of resources. When a plurality of UEs monitor the same CORESET, UE A may receive information on SSB transmission only through cell-specific signaling, and UE B may receive the information on the SSB transmission only through UE-specific signaling. Alternatively, when the information received by UE A through the cell-specific signaling is different from the information received by UE B through the UE-specific signaling, the SSB configuration of UE A may be different from the SSB configuration of UE B. Further, when an analog beam associated with a serving SSB selected by UE A is different from an analog beam associated with a serving SSB selected by UE B, the SSB configuration of UE A may be different from the SSB configuration of UE B.

When each UE has a different SSB configuration, each UE may perform different CORESET reconfiguration.

For example, upon receiving the information on the SSB transmission, UE A may recognize that the SSB overlaps with the last symbol of a CORESET with a duration of 3. On the contrary, UE B fails to receive the information on the SSB transmission and thus may not know that the CORESET overlaps with the SSB. UE A may assume the CORESET with the duration of 3 to be a CORESET with a duration of 2 (i.e., perform the CORESET reconfiguration) by performing rate matching of a region whether the CORESET overlaps with the SSB. In addition, UE A may also reconfigure the REG bundle size of the CORESET to be suitable for the CORESET with the duration of 2. Since UE B does not recognize the occurrence of the overlap, UE B does not perform the operations in the case of the overlap between the CORESET and the SSB. The network/BS needs to know whether each UE receives the information on the SSB and which SSB information each UE applies. When the plurality of UEs use different assumptions for the same CORESET, resources may not be used efficiently.

Hereinafter, a method of solving such a problem will be described.

When the UE knows that some resources on a control channel candidate to be monitored overlap with the SSB, the UE may perform puncturing of the overlapping resource region. As described above, when it is said that the UE performs puncturing of an overlapping resource region, it may mean that although the UE assumes that a specific signal is mapped to the corresponding resource, the UE does not decode a signal received on the corresponding resource. The UE does not reconfigure the CORESET by performing rate matching or REG indexing. That is, the UE does not decode a signal received in the overlapping resource region.

Specifically, the UE may perform puncturing of a resource region overlapping in both the time and frequency domains as shown in FIG. 9 (a). The UE may puncture the resource region where the CORESET and the SSB overlaps in both the time and frequency domains without consideration of information on beams. In this case, the UE may use a resource region in the CORESET which is located in the same symbols as the overlapping resource region but located in a bandwidth different from the overlapping resource region in the frequency domain or a resource region in the CORESET which is located in the same bandwidth as the overlapping resource region but located in symbols different from the overlapping resource region in the time domain, thereby using the resources in the CORESET more efficiently.

Alternatively, the UE may perform puncturing (symbol-level puncturing) of all symbols where a resource region overlapping with the SSB is located as shown in FIG. 9 (b). The symbol-level puncturing may be efficient when different beams are used for CORESET transmission and SSB transmission. When the CORESET and the SSB have different spatial quasi-co location (QCL) information or when the CORESET and the SSB have different transmission configuration indicator (TCI) information, different beams may be used for the CORESET transmission and the SSB transmission.

The network/BS may transmit a signal by allocating a beam for each symbol based on multi-beam operation. The UE needs to monitor the CORESET using a beam according to a CORESET configuration. In this case, a beam different from the beam according to the CORESET configuration may be allocated to a specific symbol. The UE may perform the symbol-level puncturing in the symbol to which the beam different from that according to the CORESET configuration is allocated within the duration of the CORESET.

When the UE performs puncturing, the UE may reduce resource waste since the UE does not reconfigure the CORESET configuration such as CCE-to-REG mapping, the REG bundle size, etc.

The UE may perform the puncturing operation differently for each CORESET. In addition, the UE may perform the puncturing operation differently for each search space set.

For example, for an RMSI CORESET, the UE may perform monitoring with no puncturing by assuming that there is no overlapping CORESET. For a UE-specifically configured CORESET, the UE may determine whether there is an overlap based on received SSB information and then perform the puncturing.

For a CORESET including a CSS, the UE may perform no puncturing. For a CORESET including only a USS, the UE may perform the puncturing by considering an overlapping resource region. Considering that the CSS is monitored by multiple UEs, each UE may need to puncture a different resource region when each of the multiple UEs receives different SSB information. To avoid such a problem, the UE may perform no puncturing for the CORESET including the CSS, and the BS may perform scheduling such that the CORESET including the CSS does not overlap with the SSB.

The puncturing may be performed differently depending on whether the UE receives information. For example, the UE may perform no puncturing for the CORESET before receiving information through cell-specific signaling. After receiving the information through the cell-specific signaling, the UE may perform the puncturing for the CORESET by considering an SSB configured based on the corresponding information. Thereafter, if the UE receives information through UE-specific signaling, the UE may update the SSB configuration based on the corresponding information and perform the puncturing based on the updated SSB configuration.

FIG. 10 is a conceptual diagram illustrating a signal reception method according to the embodiments of the present disclosure.

Referring to FIG. 10, the embodiments of the present disclosure may include receiving the configuration for a CORESET (S1001) and monitoring control channel candidates in the CORESET (S1003).

The configuration for the CORESET, i.e., CORESET #X may include information on precoder granularity. The information on the precoder granularity may instruct a UE to assume that RSs for the control channel candidates are mapped to all REGs include in contiguous RBs in CORESET #X.

However, when some of the contiguous RBs overlap with CORESET #0 configured by a PBCH, the UE may not assume that the RSs for the control channel candidates are mapped to REGs included in some overlapping RBs.

In addition to the above-described operations, the UE may additionally perform the operations proposed for when CORESET #X overlaps with CORESET #0.

When CORESET #X overlaps with CORESET #0, an SSB may further overlaps with CORESET #X or CORESET #0. In this case, the UE may additionally perform the operations proposed for when the CORESET overlaps with the SSB.

When CORESET #X overlaps with CORESET #0, if a resource allocated to CORESET #X or CORESET #0 overlaps with a semi-static UL resource, the UE may additionally perform the operations proposed for when the CORESET overlaps with the SSB.

6. Device Configuration

FIG. 11 is a block diagram illustrating an example of communication performed between a wireless device 10 and a network node 20. In this case, the network node 20 can be replaced with a wireless device or a UE shown in FIG. 28.

In the present specification, a wireless device 10 or a network node 20 includes a transceiver 11/21 configured to communicate with one or more other wireless devices, a network node, and/or a different element of a network. The transceiver 11/21 can include one or more transmitter, one or more receivers, and/or one or more communication interfaces.

The transceiver 11/21 can include one or more antennas. The antenna performs a function of transmitting a signal processed by the transceiver 11/21 to the external or a function of receiving a radio signal from the external and forwarding the signal to a processing chip 12/22 according to one embodiment of the present disclosure. The antenna can be referred to as an antenna port as well. Each antenna may correspond to a physical antenna or can be configured by a combination of two or more physical antenna elements. A signal transmitted from each antenna is not further decomposed by the wireless device 10 or the network node 20. A reference signal (RS), which is transmitted in response to an antenna, defines the antenna in the aspect of the wireless device 10 or the network node 20. The RS enables the wireless device 10 or the network node 20 to estimate a channel for the antenna irrespective of whether a channel corresponds to a single wireless channel from a physical antenna or a composite channel from a plurality of physical antenna elements including the antenna. In particular, an antenna is defined to induce a channel on which a symbol on an antenna is forwarded from a channel on which a different symbol on the same antenna is forwarded. In case of a transceiver supporting a MIMO (Multi-Input Multi-Output) function that transmits and receives data using a plurality of antennas, the transceiver can be connected with two or more antennas.

According to the present disclosure, the transceiver 11/21 can support receive beamforming and transmit beamforming. For example, the transceiver 11/21 according to the present disclosure can be configured to perform functions illustrated in FIGS. 5 to 8.

And, the wireless device 10 or the network node 20 includes a processing chip 12/22. The processing chip 12/22 can include at least one processor such as a processor 13/23 and at least one memory device such as a memory 14/24.

The processing chip 12/22 can control at least one of methods and/or processes described in the present specification. In other word, the processing chip 12/22 can be configured to perform at least one or more embodiments described in the present specification.

The processor 13/23 includes at least one processor for performing a function of the wireless device 10 or the network node 20 described in the present specification.

For example, the at least one processor can transmit and receive information by controlling the transceiver 11/21 illustrated in FIG. 28.

The processor 13/23 included in the processing chip 12/22 performs coding and modulation on a signal and/or data to be transmitted to the external of the wireless device 10 or the network node 20 and transmits the signal and/or the data to the transceiver 11/21. For example, the processor 12/23 converts a data string to be transmitted into the K number of layers by performing de-multiplexing, channel coding, scrambling, modulation, etc. on the data string. The coded data string is also referred to as a codeword. The codeword is equivalent to a transport block corresponding to a data block provided by MAC layer. A transport block (TB) is coded by a codeword and a codeword is transmitted to a reception device in a form of one or more layers. In order to perform frequency up converting, the transceiver 11/21 can include an oscillator. The transceiver 11/21 can include the $N_t$ (Nt is a positive integer equal to or greater than 1) number of Tx antennas.

The processing chip 12/22 includes a memory 14/24 configured to store data, a programmable software, and/or other information for performing the embodiments described in the present specification.

In other word, according to the embodiments of the present specification, when the memory 14/24 is executed by at least one processor such as the processor 13/23, the memory enables the processor 13/23 to perform all or a part of the processes controlled by the processor 13/23 mentioned earlier in FIG. 11. Or, the memory stores a software code 15/25 including commands for performing the embodiments described in the present specification with reference to FIGS. 1 to 10.

Specifically, the wireless device 10 of FIG. 11 may be configured to perform the UE operations proposed in the present disclosure, and the network node 20 of FIG. 11 may be configured to perform the network/BS operations proposed in the present disclosure.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

As described above, the present disclosure is applicable to various wireless communication systems.

The invention claimed is:

1. A method of receiving a signal by a user equipment (UE) in a wireless communication system, the method comprising:
receiving a configuration for a first control resource set, wherein the configuration includes information on precoder granularity; and
monitoring control channel candidates for the first control resource set based on the information on the precoder granularity,
wherein even though the information on the precoder granularity instructs the UE to assume that reference signals for the control channel candidates are mapped to all resource element groups (REGs) included in contiguous resource blocks within the first control resource set, the UE assumes that the reference signals for the control channel candidates are not mapped to REGs included in several resource blocks among the contiguous resource blocks based on that the several resource blocks overlap with a second control resource set configured by a physical broadcasting channel (PBCH).

2. The method of claim 1, wherein based on that a resource region allocated for the second control resource set is included in a resource region allocated for the first control resource set, the UE assumes that a reference signal sequence of the first control resource set is also used for the second control resource set.

3. The method of claim 1, wherein the second control resource set is configured by a PBCH included in a serving synchronization signal and PBCH block (SSB) of the UE.

4. The method of claim 1, wherein the UE receives information on the second control resource set capable of overlapping with the first control resource set from a network.

5. The method of claim 1, wherein based on that several resource blocks among the contiguous resource blocks overlap with a serving synchronization signal and PBCH block (SSB), the UE skips monitoring the control channel candidates for the first control resource set in a slot in which the overlap with the SSB occurs.

6. The method of claim 1, wherein based on that several resource blocks among the contiguous resource blocks overlap with a serving synchronization signal and PBCH block (SSB), the UE performs rate matching for the first control resource set except a frequency region in which the overlap with the SSB occurs.

7. The method of claim 6, wherein the first control resource set includes resource block groups, each of which includes 6 resource blocks (RBs), and wherein based on that at least one RB in an RB group overlaps with the SSB, the UE performs the rate matching for the first control resource set by assuming that all RBs in the RB group overlap with the SSB.

8. The method of claim 6, wherein the UE monitors several control channel candidates among the control channel candidates for the first control resource set in a slot in which the overlap with the SSB occurs.

9. The method of claim 1, wherein based on that a semi-static uplink resource is allocated to several resource blocks among the contiguous resource blocks, the UE skips monitoring the control channel candidates for the first control resource set in a slot to which the uplink resource is allocated.

10. The method of claim 1, wherein the UE determines whether the first control resource set overlaps with a serving synchronization signal and PBCH block (SSB) based on first SSB information received through UE-specific signaling,
wherein the UE determines whether the second control resource set overlaps with the SSB based on second SSB information received through cell-specific signaling, and
wherein based on that the UE does not receive the first SSB information and the second SSB information, the UE assumes that there is no SSB overlapping with the second control resource set.

11. The method of claim 1, wherein based on that the first control resource set includes no common search space, the UE determines whether the first control resource set overlaps with a serving synchronization signal and PBCH block (SSB) based on first SSB information received through UE-specific signaling, and wherein based on that the first control resource set includes a common search space, the UE determines whether the first control resource set overlaps with the SSB based on second SSB information received through cell-specific signaling.

12. The method according to claim 1, wherein the UE is capable of communicating with at least one of another UE, a UE related to an autonomous driving vehicle, a base station and/or a network.

13. A user equipment (UE) for receiving a signal in a wireless communication system, the UE comprising:
a transceiver; and
a processor configured to control the transceiver,
wherein the processor is configured to:
control the transceiver to receive a configuration for a first control resource set, wherein the configuration includes information on precoder granularity; and
monitor control channel candidates for the first control resource set based on the information on the precoder granularity,
wherein even though the information on the precoder granularity instructs the processor to assume that reference signals for the control channel candidates are mapped to all resource element groups (REGs) included in contiguous resource blocks within the first control resource set, the processor is configured to assume that the reference signals for the control channel candidates are not mapped to REGs included in several resource blocks among the contiguous resource blocks based on that the several resource blocks overlap with a second control resource set configured by a physical broadcasting channel (PBCH).

14. The UE of claim 13, wherein based on that a resource region allocated for the second control resource set is included in a resource region allocated for the first control resource set, the processor is configured to assume that a reference signal sequence of the first control resource set is also used for the second control resource set.

15. The UE of claim 13, wherein the second control resource set is configured by a PBCH included in a serving synchronization signal and PBCH block (SSB) of the UE.

16. The UE of claim 13, wherein the processor is configured to control the transceiver to receive information on the second control resource set capable of overlapping with the first control resource set from a network.

17. The UE according to claim 13, wherein the UE is capable of communicating with at least one of another UE, a UE related to an autonomous driving vehicle, a base station and/or a network.

* * * * *